(12) United States Patent
Gautam et al.

(10) Patent No.: US 9,364,794 B2
(45) Date of Patent: Jun. 14, 2016

(54) METHOD TO REMOVE CARBONATE FROM A CAUSTIC SCRUBBER WASTE STREAM

(75) Inventors: Pankaj Singh Gautam, Evansville, IN (US); Vinod S. Nair, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 143 days.

(21) Appl. No.: 14/344,378

(22) PCT Filed: Sep. 13, 2012

(86) PCT No.: PCT/US2012/055159
§ 371 (c)(1),
(2), (4) Date: Sep. 22, 2014

(87) PCT Pub. No.: WO2013/040205
PCT Pub. Date: Mar. 21, 2013

(65) Prior Publication Data
US 2015/0021519 A1    Jan. 22, 2015

(30) Foreign Application Priority Data
Sep. 16, 2011   (IN) ............................ 2684/DEL/2011

(51) Int. Cl.
| | |
|---|---|
| *C01D 7/12* | (2006.01) |
| *B01D 53/96* | (2006.01) |
| *C01D 7/26* | (2006.01) |
| *B01D 53/62* | (2006.01) |

(52) U.S. Cl.
CPC ............... *B01D 53/96* (2013.01); *B01D 53/62* (2013.01); *C01D 7/26* (2013.01); *B01D 2251/304* (2013.01); *B01D 2251/606* (2013.01)

(58) Field of Classification Search
CPC ............... C01D 7/12; C01D 5/00; C01D 7/24
USPC ........................................................ 23/302 T
See application file for complete search history.

(56) References Cited

U.S. PATENT DOCUMENTS

| | | |
|---|---|---|
| 3,909,344 A | 9/1975 | Lukes |
| 5,262,134 A | 11/1993 | Frint et al. |

FOREIGN PATENT DOCUMENTS

| | | |
|---|---|---|
| CA | 829212 A | 12/1969 |
| CN | 1557708 A | 12/2004 |
| WO | 2009068670 A1 | 6/2009 |

OTHER PUBLICATIONS

International Search Report for International Application No. PCT/US2012/055159, International Application Filing Date: Sep. 13, 2012; Date of Mailing Dec. 5, 2012, 5 pages.
Written Opinion for International Application No. PCT/US2012/055159, Internation Application Filing Date Sep. 13, 2012, Date of Mailing May 12, 2012, 5 pages.

*Primary Examiner* — Edward Johnson
(74) *Attorney, Agent, or Firm* — Cantor Colburn LLP

(57) ABSTRACT

A method to recover caustic from a caustic waste stream comprises reducing the temperature of a caustic waste stream comprising dissolved $Na_2CO_3$ to a temperature less than or equal to the temperature at which the $Na_2CO_3$ precipitates from the caustic waste stream to form a caustic waste stream comprising precipitated $Na_2CO_3$ and separating the precipitated $Na_2CO_3$.

17 Claims, 1 Drawing Sheet

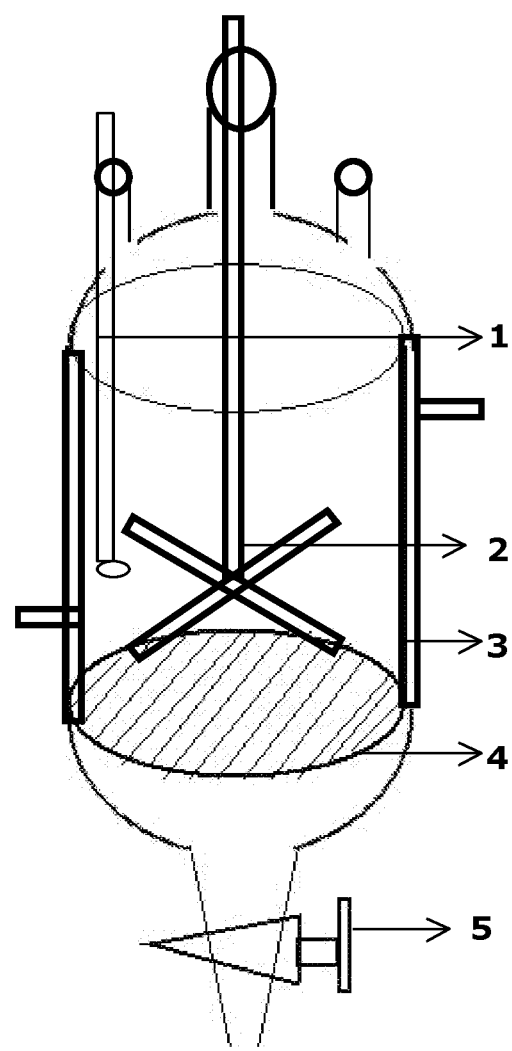

METHOD TO REMOVE CARBONATE FROM A CAUSTIC SCRUBBER WASTE STREAM

CROSS REFERENCE TO RELATED APPLICATIONS

This application claims priority to and is a national stage application of PCT Application No. PCT/US2012/055159, filed on Sep. 13, 2012. PCT Application No. PCT/US2012/055159 claims the benefit of IN Application No. 2684/DEL/2011, filed on Sep. 16, 2011. PCT Application No. PCT/US2012/055159 is incorporated by reference herein in its entirety.

BACKGROUND

Scrubbers are extensively employed in chemical operations to scrub gas streams of undesirable components before releasing into the atmosphere. Some of the scrubbers employ a solution containing a compound that can react with the target component in the gaseous stream, thereby enhancing the efficiency of absorption multifold. In the polycarbonate industry, a solution of caustic is often used to scrub phosgene off the gas stream. Caustic solution, as described herein, describes an aqueous solution comprising sodium hydroxide (NaOH) that may or may not contain sodium salts such as NaCl and $Na_2CO_3$ as well as ionic impurities typically found in hard water such as salts of $Ca^{2+}$ and $Mg^{2+}$, and trace amounts of organic or inorganic contaminants. Caustic solution shows a very high reactivity towards phosgene that enhances the efficiency of these scrubbers. For instance, caustic scrubbers are used to neutralize residual phosgene in enclosure vent gas in a phosgene production process. The spent caustic stream out of the caustic scrubbers is either fed to another scrubber which is daisy chained to it or wasted to the wastewater treatment plant. The effluent out of the scrubbers contains not only unused caustic but also a significant concentration of sodium carbonate ($Na_2CO_3$), which makes it hard to recover caustic for recycle back into the process. Carbonates have a limited solubility in water or in aqueous caustic solutions and may precipitate out of the solution. Hence, any method to recover the useful caustic from the waste stream by recycling it back to the scrubber must remove carbonates from the stream to prevent them from building up in the recycle stream and adversely affecting the unit operation by precipitating out of solution.

Chemical methods to precipitate carbonates out of aqueous caustic solution by employing calcium oxide are known. These methods are recommended only for moderately concentrated caustic solutions (less than 10 molar (<10 M)) since the solids produced in case of highly concentrated caustic solutions (greater than 10 molar (>10 M)) are very fine and filtration of the slurry is problematic. One of the main drawbacks of a chemical precipitation method is that it ends up recycling soluble $CaCO_3$ back to the scrubber, which in due time will precipitate out as the concentration builds up in the recycle stream and plug the scrubbers. Additionally, since $CaCO_3$ is not highly soluble in water, the scrubbers will need to be acidized frequently for efficient operation. These factors make this method unattractive in industrial practice as the savings in caustic usage are neutralized by the cost of calcium oxide and increased cost of maintenance.

Thus there is a need for a method to remove carbonates from a caustic scrubber waste stream to allow the treated caustic waste stream to be recycled.

BRIEF DESCRIPTION

The above described issues are addressed, at least in part, by a method to recover caustic from a caustic waste stream that comprises providing a caustic waste stream comprising dissolved $Na_2CO_3$; reducing the temperature of the caustic waste stream comprising dissolved $Na_2CO_3$ to a temperature less than or equal to the temperature at which the $Na_2CO_3$ precipitates from the caustic waste stream to form a caustic waste stream comprising precipitated $Na_2CO_3$; and removing the precipitated $Na_2CO_3$ to form a treated caustic waste stream.

The above described and other features are exemplified by the following FIGURES and detailed description.

BRIEF DESCRIPTION OF THE DRAWINGS

The FIGURE is a schematic representation of the experimental set up used in the Examples.

DETAILED DESCRIPTION

Surprisingly, it has been found that sodium carbonate ($Na_2CO_3$) can be precipitated from a caustic waste stream at temperatures below 20° C., or, more specifically, 4 to 10° C. These temperatures are readily accessible through the use of chiller systems such as industrial chilled water systems. Once the $Na_2CO_3$ has been precipitated it can be removed by one or more physical separation methods such as centrifugation, filtration, or a combination of centrifugation and filtration. After the precipitated $Na_2CO_3$ has been removed, the treated caustic waste stream can be recycled to the caustic scrubber.

Without being bound by theory, the temperature at which $Na_2CO_3$ precipitation occurs is a function of the composition of the caustic waste stream. The caustic waste stream can comprise 2 to 10 weight percent NaOH, 8 weight percent $Na_2CO_3$, and 3 weight percent NaCl, with the balance being water, and precipitation can occur at temperatures less than 20° C. or, more specifically, less than or equal to 13° C. More specifically, $Na_2CO_3$ will start precipitating out of an aqueous composition comprising 4 weight percent (wt %) NaOH, 3 wt % NaCl, 8 wt % $Na_2CO_3$ and 85 wt % water, based on the total weight of the caustic waste stream, at temperatures less than or equal to 12.77° C. When the caustic waste stream does not have the necessary concentration of components upon leaving the caustic scrubber, the waste stream can be concentrated to the desired concentration of components prior to chilling. Possible concentration methods include reverse osmosis, evaporation, membrane filtration, pervaporation, and combinations of two or more of the foregoing concentration methods.

In one embodiment, the concentration method comprises evaporation, membrane filtration, or a combination thereof. Membrane filtration may comprise reverse osmosis, nanofiltration, or a combination thereof. Nanofiltration is defined as employing a filter media having a pore size of less than or equal to 100 nanometers in diameter, or, more specifically, less than or equal to 50 nanometers, or, even more specifically, less than or equal to 10 nanometers. In some embodiments the pore size is less than or equal to 2 nanometers. The filtration system may be in fluid communication with the caustic water stream.

The caustic waste stream comprising dissolved $Na_2CO_3$ can be chilled using chilled water, or any suitable refrigerant such as ammonia, carbon dioxide, fluorocarbons, hydrofluorocarbons, or a combination of two or more of the foregoing chilling methods. The chilling method will be chosen based on the desired temperature to be obtained. Once the waste stream has reached the desired temperature, the precipitated $Na_2CO_3$ can be removed by any suitable physical separation method such as vacuum filtration, cake filtration, centrifugation, hydrocyclones, and combinations of two or more of the foregoing separation methods. Once the $Na_2CO_3$ has been removed the treated caustic waste stream can be recycled back to the caustic scrubber. In some instances it can be advantageous to include a purge stream, generally before the chilling/precipitation operations to prevent build up of trace contaminants.

The caustic waste stream can be derived from a polycarbonate production process. The polycarbonate production process can be an interfacial process, which is well known to one of ordinary skill in the art.

EXAMPLES

Example 1

A synthetic reaction mixture was prepared using deionized water with 8 weight percent sodium carbonate, 3 weight percent sodium chloride and varying concentrations of sodium hydroxide (2 weight percent, 4 weight percent, 6 weight percent, 8 weight percent, and 10 weight percent) as indicated in Table 1. Weight percents are based on the total weight of the synthetic reaction mixture (total solution including actives). The amounts of the components in the composition were chosen to mimic the conditions of a caustic scrubber waste stream from a commercial polycarbonate polymerization reaction, which uses phosgene. A schematic of the experimental set-up is shown in the FIGURE. The synthetic reaction mixture was added to the glass vessel as shown in the FIGURE. The FIGURE shows a thermocouple (1), a stirrer (2), a constant temperature circulator (3), a sintered filter (4), and a stop cock (5).

The reaction mixture was cooled to 37° F. using a Julabo* constant temperature circulator with ethylene glycol as a circulating fluid. As the temperature of the reaction mixture dropped, sodium carbonate started to precipitate. Filtered samples were collected through the stop cock at 55, 50, 45, 41, and 37° F. Samples were analyzed for sodium carbonate content by titration. Results of the amount of sodium carbonate precipitated are shown in Table 1. Results are in weight percent based upon the total amount of carbonate in the solution prior to precipitation. As sodium carbonate started to precipitate, the effective concentration of caustic increased as the sodium carbonate precipitated along with the water of hydration. In order to account for the water of hydration in the concentration of sodium carbonate precipitated, a correction factor was introduced as shown in the formula below.

Amount of sodium carbonate precipitated=100*(1−(Initial NaOH Conc./$n^{th}$ sample NaOH Conc)($n^{th}$ $Na_2CO_3$ Conc./Initial $Na_2CO_3$ Conc)), where $n$ is the sample number.

TABLE 1

Amount of Sodium Carbonate precipitated

| ° F. | ° C. | 10 wt % NaOH | 8 wt % NaOH | 6 wt % NaOH | 4 wt % NaOH | 2 wt % NaOH |
|---|---|---|---|---|---|---|
| 77 | 25 | 0.0 | 0.0 | 0.0 | 0.0 | 0.0 |
| 55 | 12.8 | 10.3 | 13.2 | 9.0 | 4.4 | 0.0 |
| 50 | 10.0 | 38.0 | 16.3 | 11.9 | 5.2 | 0.0 |
| 45 | 7.2 | 61.8 | 36.8 | 43.6 | 14.1 | 0.0 |
| 41 | 5 | 68.3 | 47.6 | 46.4 | 26.0 | 1.9 |
| 37 | 2.8 | 68.4 | 63.5 | 56.4 | 31.6 | 33.9 |

This example clearly shows that up to approximately 68 weight percent of $Na_2CO_3$ precipitated with 10 weight percent NaOH, approximately 63 weight percent of $Na_2CO_3$ precipitated with 8 weight percent NaOH, approximately 56 weight percent of $Na_2CO_3$ precipitated with 6 weight percent NaOH, approximately 32 weight percent of $Na_2CO_3$ precipitated with 4 weight percent NaOH and approximately 34 weight percent of $Na_2CO_3$ precipitated with 2 weight percent NaOH at 37° F.

Example 2

A synthetic reaction mixture was prepared with 8 weight percent sodium carbonate, 3 weight percent sodium chloride, and 4 weight percent sodium hydroxide with methylene chloride ($CH_2Cl_2$) saturated water. Weight percents are based on the total weight of the synthetic reaction mixture. Saturation of water with $CH_2Cl_2$ was done by stirring about 30 wt % $CH_2Cl_2$ with the balance of water for 14-16 hours at room temperature. Excess $CH_2Cl_2$ was removed using a separating funnel. About 500 milliliters (ml) of this synthetic reaction mixture was charged to a jacketed filter and experiments were run as described in Example 1. Samples were collected at different temperatures and analyzed for sodium carbonate content. Results after adjusting for the correction factor (as in Example 1) are presented in Table 2.

TABLE 2

| ° F. | ° C. | 4 wt % NaOH with deionized water | 4 wt % NaOH with $CH_2Cl_2$ saturated de-ionized water | 4 wt % NaOH with hard water |
|---|---|---|---|---|
| 77 | 25 | 0.00 | 0.00 | 0.00 |
| 55 | 12.8 | 4.4 | 6.6 | 1.2 |
| 50 | 10 | 5.2 | 8.1 | 1.7 |
| 45 | 7.2 | 14.1 | 14.5 | 14.2 |
| 41 | 5 | 26.0 | 29.0 | 39.9 |
| 37 | 2.8 | 31.6 | 43.3 | 42.1 |

From the Table 2 it is evident that methylene chloride ($CH_2Cl_2$) does not have any adverse effect on the sodium carbonate precipitation trends.

Example 3

A synthetic reaction mixture was prepared with 8 weight percent sodium carbonate, 3 weight percent sodium chloride and 4 weight percent caustic with hard water (hard water containing total dissolved solids at 500 ppm). 500 ml of this reaction mixture was charged to jacketed filter and experiments were as described in Example 1. Samples were collected at different temperatures and analyzed for sodium carbonate content. Results are presented in Table 2. From the results shown in Table 2 it is evident that hard water does not have any adverse effect on the sodium carbonate precipitation trends.

In one embodiment, the method to recover caustic from a caustic waste stream comprises reducing the temperature of a caustic waste stream comprising dissolved $Na_2CO_3$ to a temperature less than or equal to the temperature at which $Na_2CO_3$ precipitates from the caustic waste stream to form a caustic waste stream comprising precipitated $Na_2CO_3$; and separating the precipitated $Na_2CO_3$ from the caustic waste stream by a solid-liquid separation system. In some embodiments the temperature of the caustic waste stream comprising dissolved $Na_2CO_3$ is reduced to less than 20° C.

In the various embodiments set forth above: (i) wherein the solid-liquid separation system comprises centrifugation, filtration or a combination of centrifugation and filtration; and/or (ii) wherein the temperature is reduced with one or more chiller systems; and/or (iii) wherein the caustic waste stream comprising dissolved $Na_2CO_3$ is concentrated prior to reducing the temperature of the caustic waste stream comprising dissolved $Na_2CO_3$; and/or (iv) wherein the caustic waste stream comprising dissolved $Na_2CO_3$ is concentrated using a concentration method selected from the group consisting of reverse osmosis, evaporation, membrane filtration, pervaporation, and combinations of two or more of the foregoing concentration methods; and/or (v) wherein the concentration method comprises evaporation, membrane filtration, or a combination thereof; and/or (vi) wherein the membrane filtration method comprises reverse osmosis, nanofiltration or a combination thereof and is in fluid communication with the caustic waste stream, (vii) wherein the caustic waste stream comprising dissolved $Na_2CO_3$ is concentrated using pervaporation; and/or (viii) wherein the caustic waste stream comprising dissolved $Na_2CO_3$ is reduced to a temperature of 4 to 10° C.; and/or (ix) wherein the caustic waste stream comprising dissolved $Na_2CO_3$ is reduced to a temperature below 20° C.; and/or (x) wherein the caustic waste stream comprising dissolved $Na_2CO_3$ has $Na_2CO_3$ present in an amount of 8 weight percent, NaOH present in an amount of 2 to 10 weight percent, and NaCl present in an amount of 3 weight percent, based on the total weight of the caustic waste stream and is chilled to a temperature less than or equal to 13° C.; and/or (xi) wherein the caustic waste stream comprising dissolved $Na_2CO_3$ is reduced in temperature using chilled water, a refrigerant selected from the group consisting of ammonia, carbon dioxide, fluorocarbons, and hydrofluorocarbons, or a combination of the foregoing chilling methods; and/or (xii) wherein the caustic waste stream comprising dissolved $Na_2CO_3$ is reduced in temperature using a refrigerant selected from the group consisting of ammonia, carbon dioxide, fluorocarbons, hydrofluorocarbons and combinations thereof; and/or (xiii) wherein said caustic waste stream comprising dissolved $Na_2CO_3$ is derived from a neutralization reaction between a caustic and a phosgene containing waste stream; and/or (xiv) wherein said caustic waste stream is derived from a polycarbonate resin production process.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method to recover caustic from a caustic waste stream comprising: reducing the temperature of a caustic waste stream comprising dissolved $Na_2CO_3$ to a temperature less than or equal to the temperature at which $Na_2CO_3$ precipitates from the caustic waste stream to form a caustic waste stream comprising precipitated $Na_2CO_3$, and separating the precipitated $Na_2CO_3$ from the caustic waste stream by a solid-liquid separation system, wherein the caustic waste stream comprises dissolved $Na_2CO_3$ has $Na_2CO_3$ present in an amount of 8 weight percent, NaOH present in an amount of 2 to 10 weight percent, and NaCl present in an amount of 3 weight percent, based on the total weight of the caustic waste stream.

2. The method of claim 1, wherein the solid-liquid separation system comprises centrifugation, filtration, or a combination of centrifugation and filtration.

3. The method of claim 1, wherein the temperature is reduced with one or more chiller systems.

4. The method of claim 1, wherein the caustic waste stream comprising dissolved $Na_2CO_3$ is concentrated prior to reducing the temperature of the caustic waste stream comprising dissolved $Na_2CO_3$.

5. The method of claim 4, wherein the caustic waste stream comprising dissolved $Na_2CO_3$ is concentrated using a concentration method selected from the group consisting of reverse osmosis, evaporation, membrane filtration, pervaporation, and combinations of two or more of the foregoing concentration methods.

6. The method of claim 5, wherein the concentration method comprises evaporation, membrane filtration, or a combination thereof.

7. The method of claim 6, wherein the membrane filtration method comprises reverse osmosis, nanofiltration or a combination thereof and is in fluid communication with the caustic waste stream.

8. The method of claim 5, wherein the caustic waste stream comprising dissolved $Na_2CO_3$ is concentrated using pervaporation.

9. The method of claim 1, wherein the caustic waste stream comprising dissolved $Na_2CO_3$ is reduced to a temperature of 4 to 10° C.

10. The method of claim 1, wherein the caustic waste stream comprising dissolved $Na_2CO_3$ is reduced to a temperature below 20° C.

11. The method of claim 1, wherein the caustic waste stream is chilled to a temperature less than or equal to 13° C.

12. The method of claim 1, wherein the caustic waste stream comprising dissolved $Na_2CO_3$ is reduced in temperature using chilled water, a refrigerant selected from the group consisting of ammonia, carbon dioxide, fluorocarbons, and hydrofluorocarbons, or a combination of the foregoing chilling methods.

13. The method of claim 12, wherein the caustic waste stream comprising dissolved $Na_2CO_3$ is reduced in temperature using a refrigerant selected from the group consisting of ammonia, carbon dioxide, fluorocarbons, hydrofluorocarbons and combinations thereof.

14. The method of claim 1, wherein said caustic waste stream comprising dissolved $Na_2CO_3$ is derived from a neutralization reaction between a caustic and a phosgene containing waste stream.

15. The method of claim 1, wherein said caustic waste stream is derived from a polycarbonate resin production process.

16. A method to recover caustic from a caustic waste stream comprising: reducing the temperature of a caustic waste stream comprising dissolved $Na_2CO_3$ to a temperature less than 20° C. to form a caustic waste stream comprising precipitated $Na_2CO_3$, wherein the caustic waste stream is derived from a polycarbonate production process, and separating the precipitated $Na_2CO_3$ from the caustic waste stream by a solid-liquid separation system.

17. The method of claim 16, further comprising concentrating the caustic waste stream comprising dissolved $Na_2CO_3$ prior to reducing the temperature.

* * * * *